United States Patent
Iura et al.

(10) Patent No.: US 8,363,285 B2
(45) Date of Patent: Jan. 29, 2013

(54) IMAGE FORMING APPARATUS AND PRINT PROCESSING METHOD TO PRINT AN IMAGE ON RECORDING MEDIUM BASED ON PRINT DATA

(75) Inventors: Saori Iura, Tokyo (JP); Yasuyuki Igarashi, Kawasaki (JP); Masateru Kumagai, Yokohama (JP); Daisuke Okada, Wako (JP)

(73) Assignee: Ricoh Company, Ltd., Tokyo (JP)

( * ) Notice: Subject to any disclaimer, the term of this patent is extended or adjusted under 35 U.S.C. 154(b) by 865 days.

(21) Appl. No.: 12/457,028

(22) Filed: May 29, 2009

(65) Prior Publication Data

US 2009/0296161 A1    Dec. 3, 2009

(30) Foreign Application Priority Data

May 29, 2008 (JP) ................................ 2008-141040

(51) Int. Cl.
*G06F 3/12* (2006.01)
*G06F 17/00* (2006.01)
*G06F 7/04* (2006.01)
*G06K 15/02* (2006.01)
*H04N 1/60* (2006.01)
*H04N 1/40* (2006.01)

(52) U.S. Cl. ...... 358/3.28; 358/1.1; 358/1.14; 358/1.15; 358/1.9; 726/1; 726/2; 726/19; 726/27

(58) Field of Classification Search ................. 358/3.28, 358/1.14, 1.18, 537, 1.9, 1.15, 1.13, 440, 358/401, 405, 501, 450; 382/100, 151, 170, 382/175, 181, 214; 726/1, 2, 4, 19, 21, 26, 726/27, 32, 33, 29, 30, 35
See application file for complete search history.

(56) References Cited

U.S. PATENT DOCUMENTS

| | | | | |
|---|---|---|---|---|
| 5,798,844 | A | * | 8/1998 | Sakano et al. ................ 358/405 |
| 2001/0009591 | A1 | * | 7/2001 | Hiraishi et al. ............... 382/165 |
| 2003/0202213 | A1 | * | 10/2003 | Saito ............................ 358/1.18 |

(Continued)

FOREIGN PATENT DOCUMENTS

| | | |
|---|---|---|
| EP | 1785839 | 5/2007 |
| JP | 2004-106486 | 4/2004 |

(Continued)

OTHER PUBLICATIONS

European Search Report dated Jun. 4, 2012 issued in European Application No. 09251418.1.

*Primary Examiner* — Benny Q Tieu
*Assistant Examiner* — Ngon Nguyen
(74) *Attorney, Agent, or Firm* — Harness, Dickey & Pierce, P.L.C.

(57) ABSTRACT

An image forming apparatus to print an image on a recording medium based on print data. The image forming apparatus includes a storing unit to store the print data, an image processing unit to perform image processing on image data included in the print data; a printing operation specification unit to specify implementation of a printing operation; a marking unit to embed marking data in the image data, a marking printing operation specification unit to specify implementation of a marking printing operation, a printing operation implementation unit to implement the printing operation or the marking printing operation, a print data determination unit to determine whether or not the print data includes a setting for the marking printing operation, and a printing operation change unit to change a printing operation performed by the printing operation implementation unit.

8 Claims, 7 Drawing Sheets

U.S. PATENT DOCUMENTS

| | | | |
|---|---|---|---|
| 2004/0179220 A1* | 9/2004 | Van Oosterhout | 358/1.13 |
| 2006/0209106 A1* | 9/2006 | Kikuchi | 347/9 |
| 2007/0024873 A1* | 2/2007 | Murata et al. | 358/1.1 |
| 2007/0047826 A1 | 3/2007 | Aritomi et al. | |
| 2007/0266057 A1* | 11/2007 | Utsumi | 707/203 |
| 2008/0218792 A1* | 9/2008 | Murata et al. | 358/1.15 |
| 2008/0232640 A1* | 9/2008 | Ishizu et al. | 382/100 |
| 2009/0021758 A1* | 1/2009 | Miyazaki et al. | 358/1.13 |

FOREIGN PATENT DOCUMENTS

| | | |
|---|---|---|
| JP | 2006-014280 | 1/2006 |
| JP | 2007-158947 | 6/2007 |
| JP | 2007-306229 | 11/2007 |
| JP | 2007-329734 | 12/2007 |

\* cited by examiner

IMAGE FORMING APPARATUS AND PRINT PROCESSING METHOD TO PRINT AN IMAGE ON RECORDING MEDIUM BASED ON PRINT DATA

PRIORITY STATEMENT

The present patent application claims priority from Japanese Patent Application No. 2008-141040, filed on May 29, 2008 in the Japan Patent Office, the entire contents of which are hereby incorporated herein by reference.

BACKGROUND

1. Technical Field

Illustrative embodiments described herein generally relate to an image forming apparatus such as a digital multifunction printer, a digital copier, a facsimile machine, or a printer, a print processing method employed in the image forming apparatus, and a computer-readable recording medium storing a program for causing a CPU that controls the image forming apparatus to implement functions relating to the illustrative embodiments.

2. Description of the Related Art

Many image forming apparatuses are equipped with the capability to enhance the security of printed documents. One such capability is called marking. Marking typically includes four main functions: a manipulation detection function, an unauthorized copy guard function, a security tracing function, and a refresh copy function.

The manipulation detection function detects whether or not contents of an input document have been manipulated. Specifically, the manipulation detection function embeds marking data in image data of the input document, reads the image data of the input document in which the marking data is embedded, and compares the image data to the marking data embedded in the image data to detect whether or not the input document has been manipulated.

The unauthorized copy guard function embeds marking data in image data of a confidential document to prevent disclosure of the document to the general public through copying or mail/facsimile transmission when printing the document. Further, the unauthorized copy guard function reads the image data in which the marking data is embedded to control operations performed on the document, such as copying, mail/facsimile transmission, or storing, based on the marking data.

The security tracing function embeds a marking image indicating trace data in a document to be printed. The trace data indicates how the document is used, by whom, when, and where. Further, the security tracing function reads image data of the document in which the marking image indicating the trace data is embedded to display the trace data and store the trace data as a log.

The refresh copy function embeds marking data indicating that an original document is stored in a storage medium (such as a hard disk drive (HDD)) in a document to be output when printing the document, so that the original document from which, for example, a handwritten memo is removed, can be easily obtained. Further, the refresh copy function reads image data of the output document in which the marking data is embedded to print out the original document stored in the storage medium indicated in the marking data. Accordingly, the original document without the handwritten memo is obtained even when the handwritten memo is included in an input document.

Because the above-described marking function is for enhancing security for printing operations, it is also important to enhance security for a log (history) when a print job fails or is canceled.

For example, published unexamined Japanese Patent Application Nos. (hereinafter referred to as JP-A-) 2007-158947, 2006-014280, and 2007-306229 respectively disclose the manipulation detection function as the marking function. Specifically, the above-described patent documents disclose how to generate marking data using certain codes, embed the marking data in a document, and detect the marking data thus embedded.

However, although how to perform the marking function using certain codes and algorithms is disclosed, requirements for performing the marking function are not disclosed in the above-described patent documents.

More specifically, because the marking function is performed on image data, requirements for properly performing the marking function are needed in order to perform the printing operation using the marking function with smaller memory size when implementation of the marking function is specified simultaneously with other operations. Such operations include, for example, implementation of an image processing function that performs normal image processing such as compression of image data using compression codes, or banding that divides the image data into bands.

Because it is used for enhancing security for the printing operation, the marking function is required to be more reliably performed than the normal printing operation.

Specifically, exclusive control is required to be performed to prohibit unreliable performance of the marking function in order to protect benefits of the user. When exclusive control is performed, it is necessary to report performance of exclusive control to the user and carefully record such performance in a log.

Another approach is a technique relating to inconsistency of parameters, that is, exclusive control, during printing operations. JP-A-2007-329734 discloses how to perform exclusive control when multiple parameters of print jobs are individually specified, how to use functions of providing punched holes or staples included in an image forming apparatus relative to image data input from an external device without using a printer driver, and operations performed when functions set through a control panel of the image forming apparatus do not coincide with the parameters of the print jobs input from the external device.

However, although disclosing how to perform the functions included in the image forming apparatus relative to the image data input from the external device, JP-A-2007-329734 does not disclose exclusive control for enhancing security for the printing operations such as the marking function.

SUMMARY

In view of the foregoing, illustrative embodiments described herein provide a novel image forming apparatus capable of providing reliable security even when implementation of a marking function and implementation of an image processing function are specified simultaneously; a print processing method employed in the image forming apparatus; and a computer-readable recording medium storing a program for causing a CPU that controls the image forming apparatus to implement functions relating to the illustrative embodiments.

At least one embodiment provides an image forming apparatus to print an image on a recording medium based on print data. The image forming apparatus includes a storing unit to store the print data, an image processing unit to perform image processing on image data included in the print data, a printing operation specification unit to specify implementation of a printing operation using the image processing unit, a marking unit to embed marking data in the image data, a marking printing operation specification unit to specify implementation of a marking printing operation using the marking unit, a printing operation implementation unit to implement the printing operation specified by the printing operation specification unit or the marking printing operation specified by the marking printing operation specification unit, a print data determination unit to determine whether or not the print data includes a setting for the marking printing operation when implementation of the printing operation is specified by the printing operation specification unit at the same time as when implementation of the marking printing operation is specified by the marking printing operation specification unit, and a printing operation change unit to change a printing operation performed by the printing operation implementation unit depending on a determination result obtained by the print data determination unit.

At least one embodiment provides a print processing method employed in an image forming apparatus including a storing unit to print an image on a recording medium based on print data stored in the storing unit. The print processing method includes the steps of processing image data included in the print data, specifying implementation of a printing operation using the processing, embedding marking data in the image data, specifying implementation of a marking printing operation using the embedding, implementing the printing operation or the marking printing operation, determining whether or not the print data includes a setting for the marking printing operation when implementation of the printing operation is specified at the same time as when implementation of the marking printing operation is specified, and changing a printing operation performed by the implementing depending on a determination result obtained by the determining.

At least one embodiment provides a recording medium storing a program for causing a computer that controls an image forming apparatus including a storing unit to print an image on a recording medium based on print data stored in the storing unit to execute a print processing method. The print processing method includes the steps of processing image data included in the print data, specifying implementation of a printing operation using the processing, embedding marking data in the image data, specifying implementation of a marking printing operation using the embedding, implementing the printing operation or the marking printing operation, determining whether or not the print data includes a setting for the marking printing operation when implementation of the printing operation is specified at the same time as when implementation of the marking printing operation is specified, and changing a printing operation performed by the implementing depending on a determination result obtained by the determining.

Additional features and advantages of the illustrative embodiments will be more fully apparent from the following detailed description, the accompanying drawings, and the associated claims.

BRIEF DESCRIPTION OF THE DRAWINGS

A more complete appreciation of illustrative embodiments and the many attendant advantages thereof will be readily obtained as the same becomes better understood by reference to the following detailed description when considered in connection with the accompanying drawings, wherein.

Figure 1:
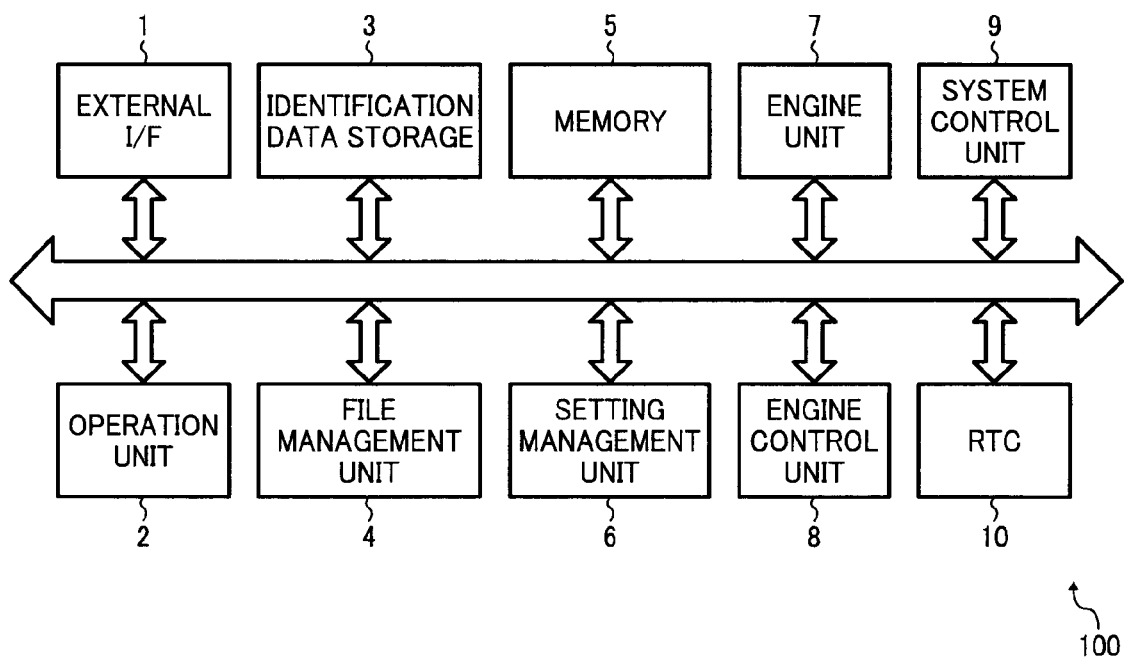
FIG. 1 is a block diagram illustrating a configuration of an image forming apparatus according to illustrative embodiments.

The accompanying drawings are intended to depict illustrative embodiments and should not be interpreted to limit the scope thereof. The accompanying drawings are not to be considered as drawn to scale unless explicitly noted.

DETAILED DESCRIPTION OF ILLUSTRATIVE EMBODIMENTS

In describing illustrative embodiments illustrated in the drawings, specific terminology is employed for the sake of clarity. However, the disclosure of this specification is not intended to be limited to the specific terminology so selected, and it is to be understood that each specific element includes all technical equivalents that operate in a similar manner and achieve a similar result.

Reference is now made to the drawings, wherein like reference numerals designate identical or corresponding parts throughout the several views.

FIG. 1 is a block diagram illustrating a configuration of an image forming apparatus 100 according to illustrative embodiments.

The image forming apparatus 100 includes an external interface (I/F) 1, an operation unit 2, an identification data storage 3, a file management unit 4, a memory 5, a setting management unit 6, an engine unit 7, an engine control unit 8, a system control unit 9, and a real-time clock circuit (RTC) 10.

The external I/F 1 serves as communication means to communicate with an external personal computer (PC), not shown, through a network such as a local area network (LAN), Internet, or a public circuit. Alternatively, the external I/F 1 may communicate with external devices other than the external PC, such as an image processing device including a workstation or an image reading device including a scanner, via a network.

The operation unit 2 includes an input unit to specify a setting of each function, and a display unit to display a status of the image forming apparatus 100.

The identification data storage 3 serves as storing means to store identification data sent from a sender, and includes nonvolatile storing means including a nonvolatile memory such as a flash ROM and EEPROM, or a hard disk device (HDD).

The file management unit 4 performs file management operations on the identification data.

The memory 5 serves as storing means used as an image area to expand image data, and includes a RAM.

The setting management unit 6 manages and controls set functions.

The engine unit 7 includes a scanner unit or an image reading unit to read image data of a document, and a plotter unit or a printing unit to output the image data on a recording medium such as a sheet to form a visible image on the sheet in accordance with a series of processes.

The engine control unit 8 causes the scanner unit to read the image data of the document, and processes and controls data to cause the engine unit 7 to output the image data. The engine control unit 8 functions as image processing means, normal printing operation specification means, marking means, marking printing operation specification means, printing operation implementation means, print data determination means, printing operation change means, marking option setting means, first data determination means, marking requirement setting means, second data determination means, reporting means, data deletion means, log storing means, stored data selection means, and log data selection means according to illustrative embodiments.

The system control unit 9 controls the image forming apparatus 100.

The RTC 10 includes clock and calendar functions.

Each of the file management unit 4, the setting management unit 6, the engine control unit 8, and the system control unit 9 uses a central processing unit (CPU) included in a microcomputer and nonvolatile storing means such as a ROM, a RAM, or an HDD. In other words, the CPU executes programs in the ROM or programs read from the nonvolatile storing means and run in the RAM to implement the functions of the file management unit 4, the setting management unit 6, the engine control unit 8, and the system control unit 9.

Figure 2:
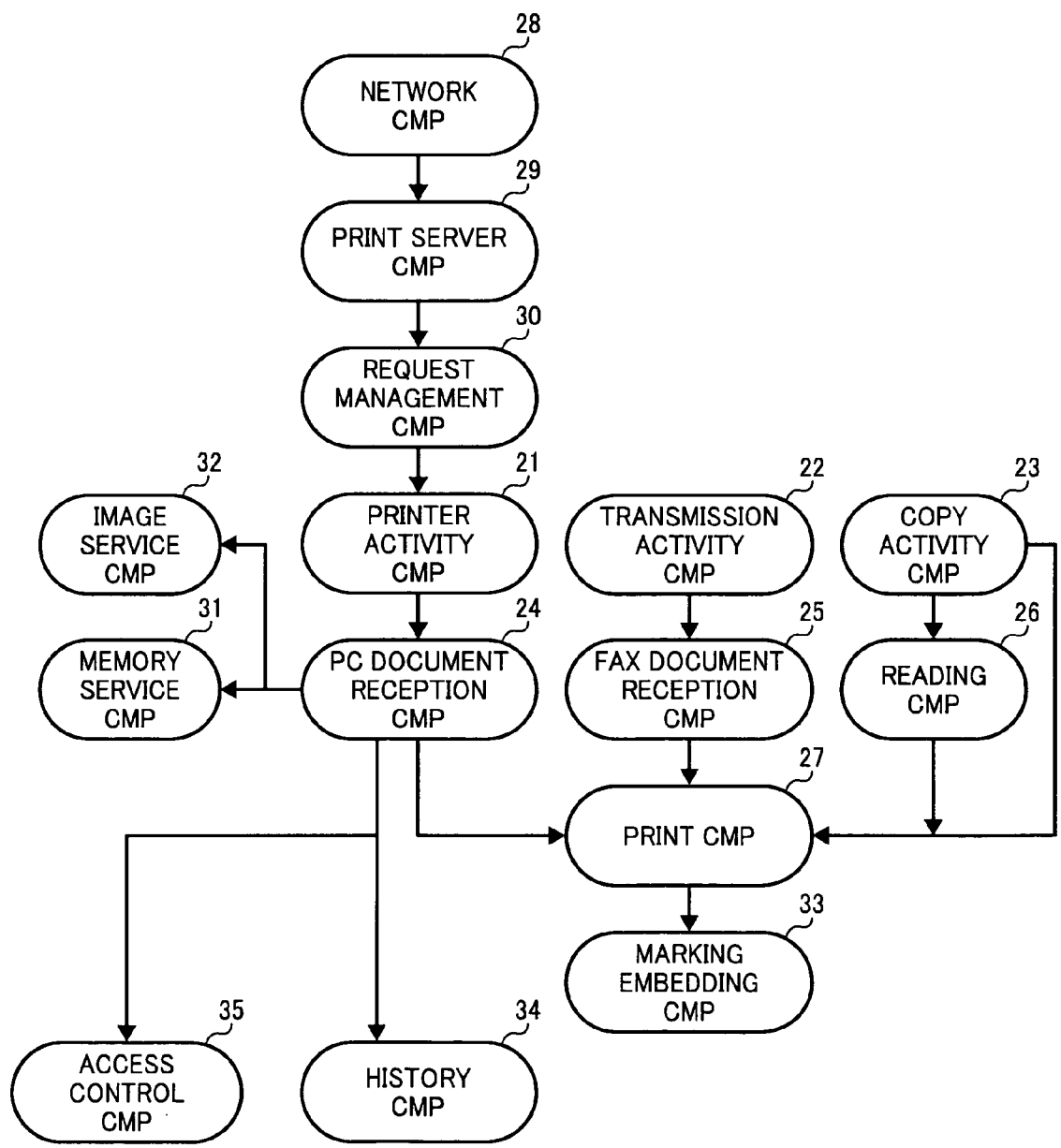
FIG. 2 is a block diagram illustrating an example of a configuration of software components of a program for implementing functions of a setting management unit, an engine control unit, and a system control unit, respectively, included in the image forming apparatus illustrated in FIG. 1.

A description is now given of software components of the program for implementing the functions of the setting management unit 6, the engine control unit 8, and the system control unit 9 respectively included in the image forming apparatus 100 with reference to FIG. 2. It is to be noted that processing performed by the program is actually implemented by operating the CPU in accordance with the program. However, in order to simplify the explanation, it is hereinafter assumed that the processing is performed by the program.

FIG. 2 is a block diagram illustrating an example of a configuration of the software components of the program for implementing the functions of the setting management unit 6, the engine control unit 8, and the system control unit 9. Each of oval frames illustrated in FIG. 2 indicates a component (CMP).

The program includes, as main components thereof, an activity CMP and a filter CMP.

The activity CMP includes a printer activity CMP 21, the transmission activity CMP 22, and a copy activity CMP 23.

The filter CMP includes a PC document reception CMP 24, a FAX document reception CMP 25, a reading CMP 26, and a print CMP 27.

Messages are transmitted between the activity CMP and the filter CMP. Image data is transmitted among the components in the filter CMP.

The activity CMP manages jobs. Specifically, the printer activity CMP 21 manages print jobs, the transmission activity CMP 22 manages FAX jobs, and the copy activity CMP 23 manages copy jobs and scanner jobs.

The PC document reception CMP 24 analyzes print data received from the network, and expands image data for printing in a single band in an image area of the memory 5, or if needed, divides the image data for printing into multiple bands to expand the image data in the multiple bands in the image area of the memory 5. Division of the image data for printing into the multiple bands is one of processing performed as a normal image processing operation.

The FAX document reception CMP 25 analyzes FAX data received from the network, and expands image data for printing in a single band in the image area of the memory 5, or if needed, divides the image data for printing into multiple bands to expand the image data in the multiple bands in the image area of the memory 5.

The reading CMP 26 analyzes image data including copy data and scanner data read by the scanner unit, which is a part of the engine unit 7, and expands image data for printing in a single band in the image area of the memory 5, or if needed, divides the image data for printing into multiple bands to expand the image data in the multiple bands in the image area of the memory 5.

The print CMP 27 causes the plotter unit, which is a part of the engine unit 7, to output the image data.

The program further includes a network CMP 28 that initializes the external I/F 1 so that the external I/F 1 communicates with the external devices. Specifically, the external I/F 1 is initialized to set a network address, a routing table, and name resolution.

A print server CMP 29 performs control to implement server communication functions such as reception of communication connection, reception and response of data, and implementation of server functions used for a Web service, direct print, and so forth. When receiving data, the print server CMP 29 assigns a request management CMP 30 to perform a request.

The request management CMP 30 determines order to perform multiple requests, and causes the requests to be performed in that order. The request management CMP 30 manages a life cycle of the requests, and recovers failed requests such that the requests are properly performed.

A memory service CMP 31 causes the memory 5 to be effectively used by acquiring or opening data in bands and reusing the bands. Further, the memory service CMP 31 dynamically obtains additional memory.

An image service CMP 32 performs requested image processing, such as scaling, rotation, compression/expansion, color space conversion, or watermarking, on image data. The above-described image processing is also performed as the normal image processing operation. The image service CMP 32 inputs and outputs image data using an application specific integrated circuit (ASIC), and stores and reads out the image data to and from an HDD or the like.

A marking embedding CMP 33 creates images of data specified to be embedded as marking data (hereinafter referred to as marking) to embed the marking in input image data.

A history CMP 34 provides various histories such as usage history, operating history, and security log to a user by displaying such histories on a display unit of the external device or a display unit of the operation unit 2 so that the user can search, reference, or delete the histories.

An access control CMP 35 controls access to information assets to be guarded and functions used for operating the information assets. The access control CMP 35 operates on the basis of a security policy including a relation between functions/contents and account/role (e.g., user/administrator) referenced at determination.

A correlation between the above-described components and the setting management unit 6, the engine control unit 8, and the system control unit 9 is as follows. Each of the printer activity CMP 21, the transmission activity CMP 22, the copy activity CMP 23, the network CMP 28, the print server CMP 29, the request management CMP 30, the memory service CMP 31, the image service CMP 32, the history CMP 34, and the access control CMP 35 is implemented by the system control unit 9. Each of the PC document reception CMP 24, the FAX document reception CMP 25, and the reading CMP 26 is implemented by the engine control unit 8 and the setting management unit 6. The print CMP 27 is implemented by the engine control unit 8. The marking embedding CMP 33 is implemented by the system control unit 9 and the setting management unit 6.

In the following illustrative embodiments, printing operations relating to a print job performed when implementation of a marking function and implementation of an image processing function, including compression and banding of image data, are specified simultaneously are described. It is to be noted that printing operations relating to a copy job and a FAX job are similarly performed when implementation of the marking function and implementation of the image processing function are specified simultaneously.

A description is now given of a first illustrative embodiment.

Figure 3:
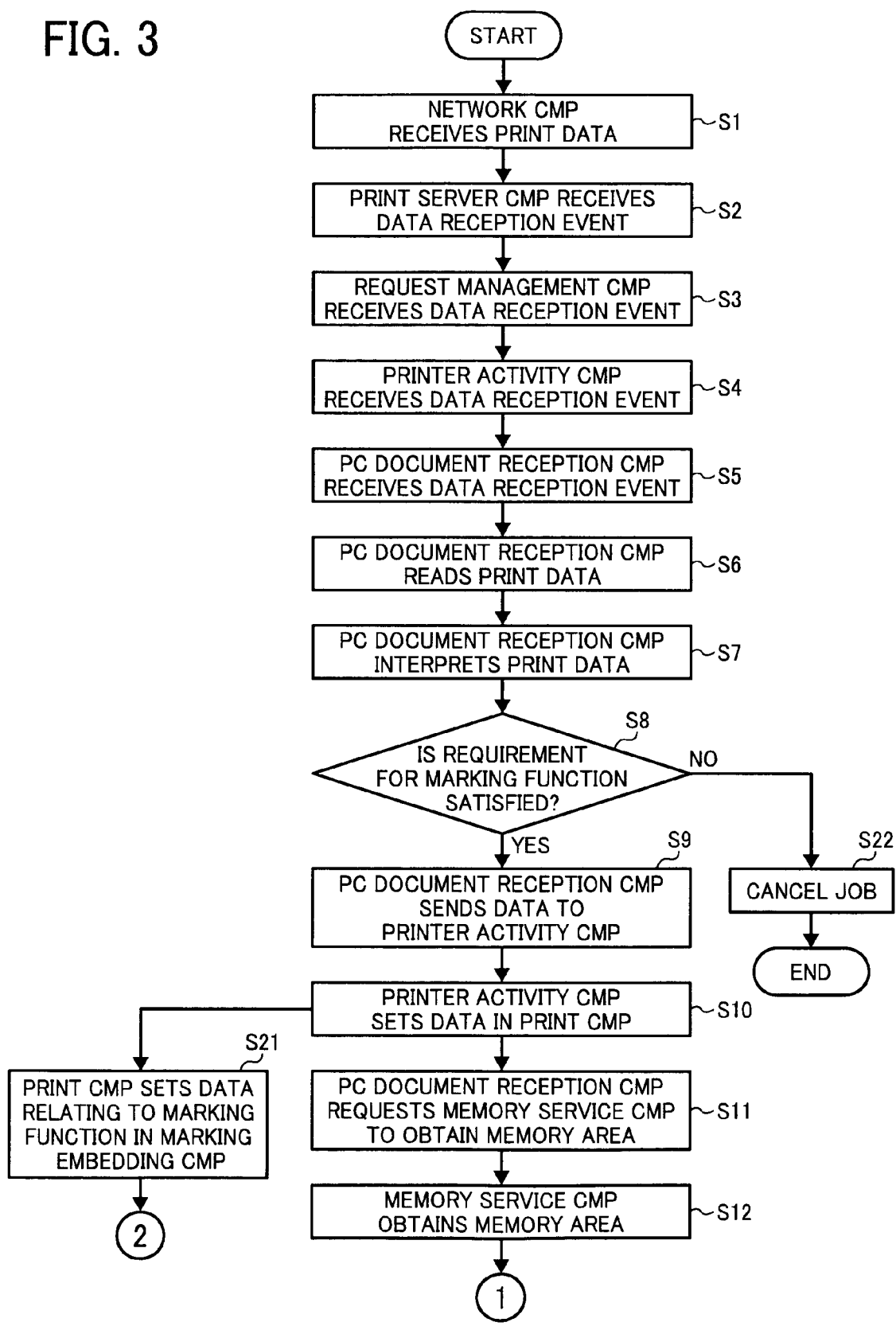
FIG. 3 is a flowchart illustrating an example of print processing performed when implementation of a marking function and implementation of an image processing function are specified simultaneously in the image forming apparatus illustrated in FIG. 1.
Figure 4:
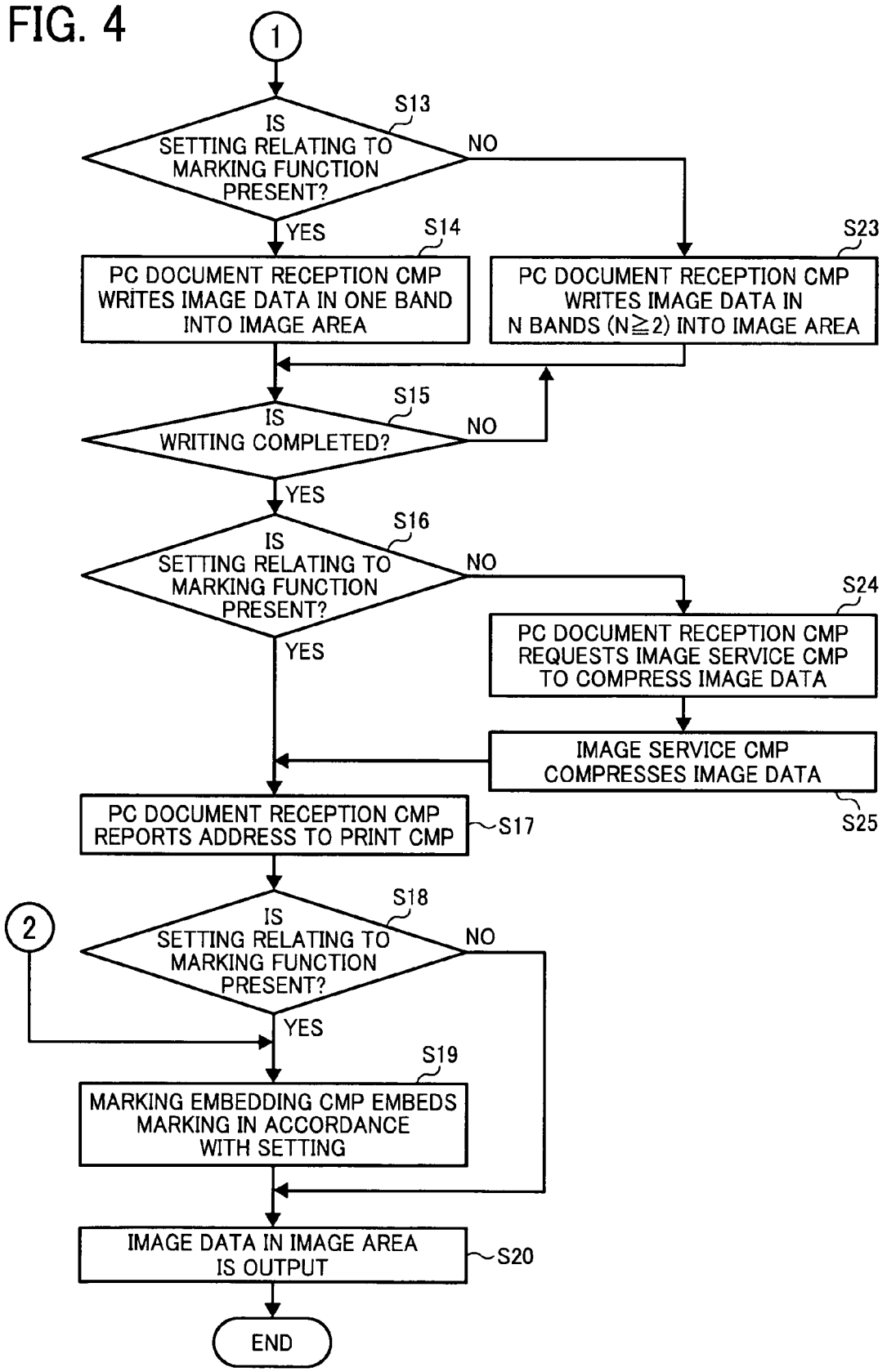
FIG. 4 is a flowchart illustrating the rest of the print processing illustrated in FIG. 3.

FIGS. 3 and 4 are together a single flowchart illustrating an example of print processing performed when implementation of the marking function and implementation of the image processing function are specified simultaneously in the image forming apparatus 100, that is, the software components illustrated in FIG. 2. The marking function and the image processing function are specified through the operation unit 2 or the external devices.

The print processing when implementation of the marking function and implementation of the image processing function are specified simultaneously is started by inputting a corresponding print job.

Referring to FIG. 3, at S1, the network CMP 28 receives print data sent from the external PC. It is to be noted that the print data includes document data, job data, page data, and image data. The document data is data on a document, that is, data on the print data. For example, the document data includes a job name, a document name, a user ID, a password, a PC login name, a PC name, and date and time of creation. The job data is data for each job, and includes print type, number of copies to be printed, sorting type, print mode, aggregation type, data on a binding margin, a cover page, a slip sheet, a chapter sheet, and punched holes, folding types, toner save mode, number of colors, type of marking, and so forth.

The page data is data for each page, and includes sheet type, sheet size, print mode, dithering mode, document orientation, number of bands, resolution in main scanning and sub-scanning directions, thinning level, quantization number, data on a discharge tray, 180-degree rotation, and simplex or duplex printing, and so forth.

The image data is data indicating an image to be output, that is, the print data itself.

Returning to FIG. 3, at S2, the print server CMP 29 receives a data reception event sent form the network CMP 28. At S3, the request management CMP 30 receives the data reception event sent from the print server CMP 29. At S4, the printer activity CMP 21 receives the data reception event sent from the request management CMP 30.

At S5, the PC document reception CMP 24 receives the data reception event sent from the printer activity CMP 21. At S6, the PC document reception CMP 24 reads print data sent from the network CMP 28. At S7, the PC document reception CMP 24 stores the print data thus read into a temporary area of the memory 5 to interpret the print data.

At S8, the PC document reception CMP 24 determines whether or not the document, job, and page data included in the print data thus interpreted correspond to a requirement for performing the marking function. When the document, job, and page data correspond to the requirement (Yes at S8), the process proceeds to S9. When the document, job, and page data do not correspond to the requirement (No at S8), the process proceeds to S22.

It is to be noted that the requirement for performing the marking function is a requirement relating to setting values for the document, job, and page data to perform the marking function, and is set through the operation unit 2 or the external device. An example of the requirement for performing the marking function is that the paper size is set to a predetermined size such as A3, A4, B4, or B5, the color mode is set to monochrome, and the quantization number is 1 bit.

At S22, the PC document reception CMP 24 cancels the job in which the marking function is specified, and prevents the plotter unit from performing printing operations.

At S9, the PC document reception CMP 24 sends the document, job, and page data included in the print data interpreted as described above to the printer activity CMP 21. At S10, the printer activity CMP 21 sets the document, job, and page data thus received in the print CMP 27. At S21, the print CMP 27 sets data relating to the marking function included in the document, job, and page data in the marking embedding CMP 33.

At S11, the PC document reception CMP 24 requests the memory service CMP 31 to obtain a memory area for expanding image data. At S12, the memory service CMP 31 obtains the memory area on the memory 5 to expand the image data.

Referring to FIG. 4, at S13, the PC document reception CMP 24 determines whether or not a setting relating to the marking function is present in the print data interpreted as described above. When the setting is present (YES at S13), the process proceeds to S14. When the setting is not present (NO at S13), the process proceeds to S23.

At S14, the PC document reception CMP 24 writes the image data included in the interpreted print data in one band (or no band) in the image area on the memory 5. Meanwhile, at S23, the PC document reception CMP 24 divides the image data included in the interpreted print data into N bands, where N is an integer equal to or greater than 2, to sequentially write the print data in N bands in the image area on the memory 5. Thereafter, the process proceeds to S15.

At S15, the PC document reception CMP 24 writes the image data into the image area. When writing of the image data into the image area is not completed (NO at S15), the process returns to S15. When writing of the image data into the image area is completed (YES at S15), the process proceeds to S16.

At S16, the PC document reception CMP 24 determines whether or not the setting relating to the marking function is present in the interpreted print data again. When the setting is present (YES at S16), the process proceeds to S17. When the setting is not present (NO at S16), the process proceeds to S24. At S24, the PC document reception CMP 24 requests the image service CMP 32 to compress the image data. At S25, the image service CMP 32 compresses the image data written into the image area in response to the request.

At S17, the PC document reception CMP 24 reports an address of the image area into which the image data is written to the print CMP 27. At S18, the PC document reception CMP 24 determines whether or not the setting relating to the marking function is present in the interpreted print data again. When the setting is present (YES at S18), the process proceeds to S19. When the setting is not present (NO at S18), the process proceeds to S20. At S19, the marking embedding CMP 33 embeds a marking in the image data written into the image area in accordance with the setting relating to the marking function.

At S20, the print CMP 27 causes the plotter unit to output the image data written into the image area. Here, the image data includes the image data in which the marking is embedded or the image data compressed by the image service CMP 32.

In the normal printing operation, that is, printing operations other than a special printing operation such as a marking printing operation, the image data may be output with a smaller memory size by compressing the image data or by dividing the image data into multiple bands.

When implementation of the marking function of outputting the image data having the embedded marking therein and implementation of the image processing function of compressing or banding the image data are specified simultaneously, settings of each function are always associated with each other as shown in Table 1 below.

Specifically, as described above, in a case in which implementation of the marking function is specified, implementation of the image processing function such as compression of the image data or dividing of the image data into multiple bands is prohibited even when implementation of the image processing function is specified. Only when implementation of the marking function is not specified is implementation of compression of the image data and dividing of the image data into multiple bands allowed.

TABLE 1

|  | Compression | Banding |
|---|---|---|
| Marking: Specified | Performed | One Band (or No Band) |
| Marking: Not Specified | Not Performed | N bands (N is any integer equal to or greater than 2) |

According to the first illustrative embodiment, when implementation of the normal printing operation using the image processing function that performs the normal image processing operations on the image data including the print data and implementation of the marking printing operation using the marking function that embeds marking data in the image data are specified simultaneously, settings for the normal printing operation and settings for the marking printing operation are compared with each other, so that the printing operation to be performed is changed based on the comparison result. Accordingly, implementation of the normal printing operation is prohibited. As a result, security breakdowns can be prevented even when implementation of the marking function and implementation of the image processing function are specified simultaneously. Specifically, high security printing operations can be achieved by reliably performing the marking printing operation, protecting benefits of the user who specifies implementation of the marking printing operation.

Figure 5:
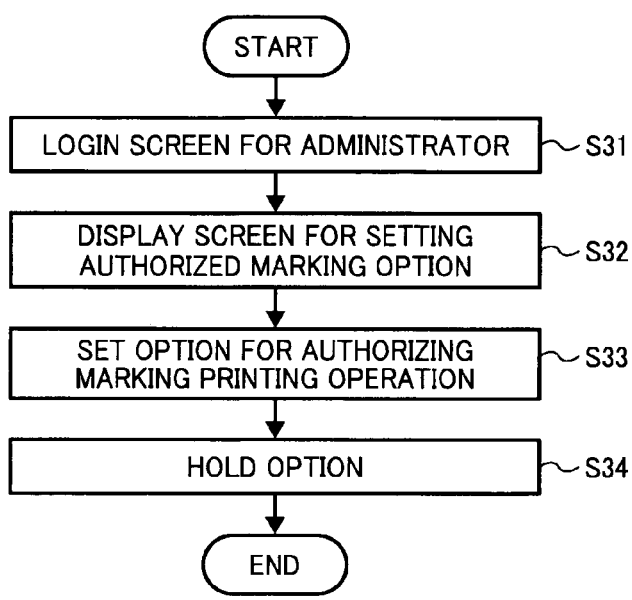
FIG. 5 is a flowchart illustrating an example of a process of setting marking options for printing authorized by an administrator in advance.
Figure 6:
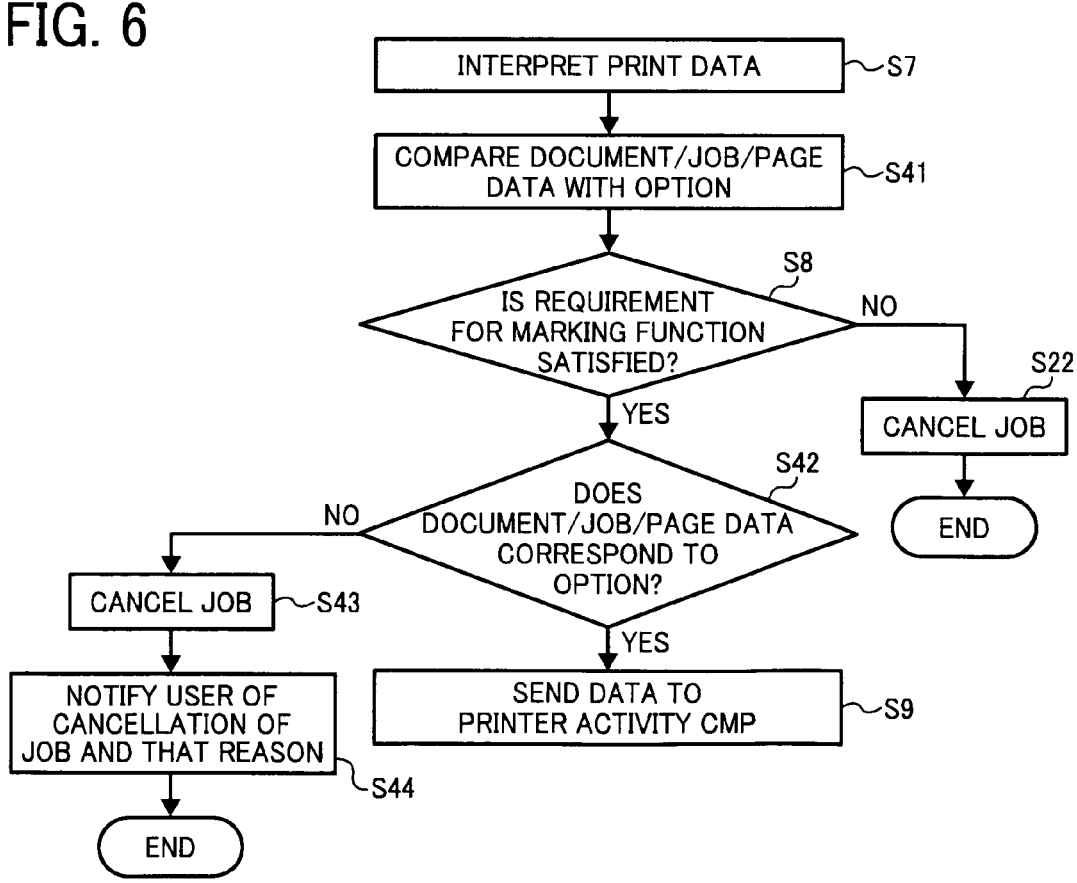
FIG. 6 is a flowchart illustrating another example of print processing performed when implementation of the marking function and implementation of the image processing function are specified simultaneously in the image forming apparatus illustrated in FIG. 1.

A description is now given of a second illustrative embodiment with reference to FIGS. 5 and 6 and Table 2. It is to be noted that, because the second illustrative embodiment is only slightly different from the first illustrative embodiment, only differences from the first illustrative embodiment are described in detail below.

FIG. 5 is a flowchart illustrating an example of how the administrator presets marking options for authoring the marking printing operation using the image forming apparatus 100.

The image forming apparatus 100 starts a series of processes illustrated in FIG. 5 when receiving an instruction to log in to a screen for the administrator input by the administrator through the operation unit 2, which is a user interface of a machine operated by the administrator. At S31, a CMP, not shown, logs in to the screen for the administrator to display the screen on the operation unit 2. At S32, the administrator operates the screen to display a screen for setting authorized marking options on the operation unit 2.

At S33, the administrator operates the screen for setting the authorized marking options to set options for authorizing the marking printing operation, such as an error correction level and an embedding mode among options for each setting item for the marking printing operation. Thereafter, at S34, the PC document reception CMP 24 holds the options for authorizing the marking printing operation for each setting item thus set.

An example of the setting items and the options for the marking printing operation is illustrated in Table 2.

TABLE 2

| Items | Options |
|---|---|
| Embedding Type | No Embedding/Unauthorized Copy Guard/ Security Trace/Manipulation Detection Unauthorized Copy Guard |
| Type of Tint Block | Suppression Symbol/Unauthorized Copy Guard/ Unauthorized Copy Guard EX/Security Trace/ Tint Block Area |
| Color of Suppression Symbol | Black/Cyan/Magenta |
| Density of Suppression Symbol | 1 to 5 |
| Effect/Font Color of Suppression Symbol | Already Disappeared/To Be Disappeared/ Not Disappeared |
| Effect/Background of Suppression Symbol | Already Disappeared/To Be Disappeared/ Not Disappeared |
| Color of Suppression Symbol | |
| Pattern of Suppression Symbol | No Pattern/Blue Wave/Mesh/Lattice/Crest/ Octagon/Zigzag/Scale/Rectangle/Hexagon |
| Device Control Code | 0 to 999 |
| | Security Trace |
| Security Trace Format | User ID/Paper ID |
| Embedding Mode | Priority on Paper Quality/Normal/ Priority on Tolerance |
| | Embedding of Manipulation Detection |
| Density of Tint Block | Light/Intermediate/Dark |

TABLE 2-continued

| Items | Options |
| --- | --- |
| Refresh Copy | |
| Embedding | ON/OFF |
| Embedding Position | Upper Right/Upper Left/Lower Right/Lower Left |
| Embedding Position (Vertical Direction) | 0.0 to 32767.0 |
| Embedding Position (Horizontal Direction) | 0.0 to 32767.0 |
| Barcode Format | QR/PDF417/DataMatrix |

The printing operation performed when the options for authorizing the marking printing operation for each setting item are set, that is, when the process performed between S7 and S9 in FIG. 3, is changed to, for example, the process illustrated in FIG. 6. For ease of illustration, it is assumed that only one setting item for the marking printing operation is set in FIG. 6.

FIG. 6 is a flowchart illustrating another example of print processing performed when implementation of the marking function and implementation of the image processing function are specified simultaneously in the image forming apparatus 100. It is to be noted that only differences from the process illustrated in FIG. 3 are illustrated in FIG. 6.

After interpreting the print data read at S7, at S41, the PC document reception CMP 24 compares the document, job, and page data included in the interpreted print data to the options for authorizing the marking printing operation preset for each setting item. At S8, the PC document reception CMP 24 determines whether or not the document, job, and page data included in the interpreted print data correspond to a requirement for implementing the marking function. When the document, job, and page data correspond to the requirement (YES at S8), the process proceeds to S42. By contrast, when the document, job, and page data do not correspond to the requirement (NO at S8), the process proceeds to S22.

At S42, the PC document reception CMP 24 determines whether or not the document, job, and page data included in the interpreted print data correspond to the preset options for authorizing the marking printing operation for each setting item based on the comparison result. When the document, job, and page data correspond to the options (YES at S42), the process proceeds to S9. By contrast, when the document, job, and page data do not correspond to the options (NO at S42), the process proceeds to S43. At S43, the PC document reception CMP 24 cancels the job to prohibit the plotter unit from performing the printing operation.

At S44, the PC document reception CMP 24 notifies the user that the print job is canceled and the reason for such cancellation. Specifically, the PC document reception. CMP 24 sends data indicating cancellation of the print job and the reason therefor to the sender of the print data, and causes a display unit of the sender to display such data to report the data to the user. It is to be noted that the data indicating cancellation of the print job and the reason therefor may be displayed on a display unit of the image forming apparatus 100 to report such data to the user. Alternatively, the print data may be deleted from the memory 5 and a status of deletion of the print data, such as deletion started, deleting, or deletion completed, may be reported to the user. It is to be noted that the process at S44 may also be performed after the process at S22.

According to the second illustrative embodiment, the options for authorizing the marking printing operation can be selected from among the options for the marking printing operation. The PC document reception CMP 24 determines whether or not the print data corresponds to the options thus selected. When the PC document reception CMP 24 determines that the print data does not correspond to the options thus selected, the print job is canceled to prohibit the printing operation so that security breakdowns can be reliably prevented. Further, cancellation of the print job or failure of the marking printing operation and the reason therefor are reported to the user, so that security for implementation of the marking printing operation can be enhanced.

Figure 7:
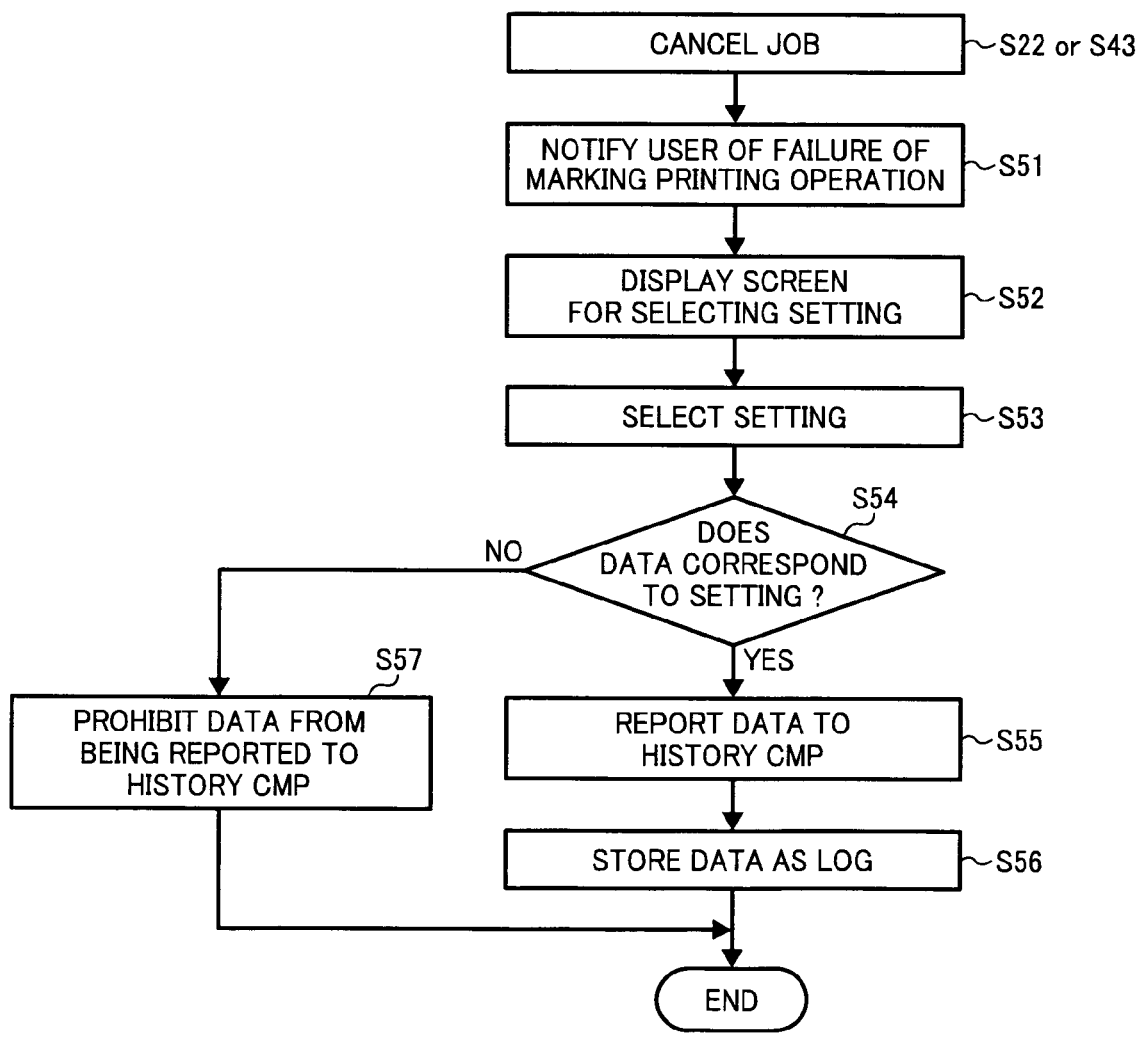
FIG. 7 is a flowchart illustrating yet another example of print processing performed when implementation of the marking function and implementation of the image processing function are specified simultaneously in the image forming apparatus illustrated in FIG. 1.

A description is now given of a third illustrative embodiment with reference to FIG. 7. Because the third illustrative embodiment is slightly different from the first and second illustrative embodiments described above, only differences from the first and second illustrative embodiments are described in detail below.

FIG. 7 is a flowchart illustrating yet another example of print processing performed when implementation of the marking function and implementation of the image processing function are specified simultaneously in the image forming apparatus 100. It is to be noted that only differences from the processes illustrated in FIGS. 3 and 6 are illustrated in FIG. 7. In FIG. 7, the process to select data to be stored as a log when the marking printing operation fails is illustrated. Examples of the log include an error log and an error report that are visually confirmed by the user.

The data to be stored as the log is selected when the marking printing operation fails. Specifically, after the print job in which the marking function is specified is canceled for some reason, that is, after S22 in FIG. 3 or S43 in FIG. 6, the data to be stored as the log is selected. In a case in which selection of the data to be stored as the log is performed subsequent to S43 in FIG. 6, a process of S51 in FIG. 7 is performed in place of the process of S44 in FIG. 6. Alternatively, the process of S44 may be performed at S51 in FIG. 7.

After canceling the print job at S22 in FIG. 3 or S43 in FIG. 6, at S51 in FIG. 7 the PC document reception CMP 24 sends data indicating failure of the marking printing operation to the sender of the print job, that is, for example, to the eternal PC, through the network CMP 28 and causes the display unit of the external PC or the display unit of the image forming apparatus 100 to display such data to the user.

At S52, the PC document reception CMP 24 sends data used for displaying a screen for selecting a setting to store the log to the sender of the print job through the network CMP 28. As a result, such a screen is displayed on the display unit of the sender.

At S53, the PC document reception CMP 24 receives the data indicating the setting for storing the log thus selected by the user through the screen from the network CMP 28, and selects a setting indicated by such data.

At S54, the PC document reception CMP 24 determines whether or not the document, job, and page data included in the interpreted print data, and the data indicating failure of the marking printing operation correspond to the setting for storing the log selected as described above. When such data correspond to the setting, the process proceeds to S55. By contrast, when such data do not correspond to the setting, the process proceeds to S57.

At S55, the PC document reception CMP 24 permits the data corresponding to the setting to be reported to the history CMP 34, so that the data is reported to the history CMP 34. At S56, the history CMP 34 stores the data thus reported in the nonvolatile storage means such as an HDD as the log. At S57, the PC document reception CMP 24 prohibits the data not corresponding to the setting from being reported to the history CMP 34. It is to be noted that the processes of S52 and S53 may be performed at any time before the printing operation is started, for example, at the same time as when a size of a recording medium used for printing or implementation of the marking function is specified.

According to the third illustrative embodiment, predetermined data is stored as the log when the print job is cancelled. In addition, such predetermined data to be stored as the log is selectable. Accordingly, security for implementation of the marking printing operation can be enhanced.

A description is now given of a fourth illustrative embodiment. Because the fourth illustrative embodiment is only slightly different from the third illustrative embodiment, only differences from the third illustrative embodiment are described in detail below. It is to be noted that a person to whom the log indicating failure of the marking printing operation is disclosed is hereinafter referred to as a role. The role is either the administrator or the general user. There are two disclosure levels of the log: a level for displaying all logs and a level for displaying logs using special characters such as an asterisk.

According to the fourth illustrative embodiment, at S52 in FIG. 7, the PC document reception CMP 24 sends the data used for displaying the screen for selecting the setting to store the log to the sender of the print job through the network CMP 28, so that the screen is displayed on the display unit. At the same time, the PC document reception CMP 24 also sends data used for displaying a screen for selecting the role and the disclosure level to the sender of the print job so that the screen for selecting the role and the disclosure level is also displayed on the display unit.

At S53, the PC document reception CMP 24 receives data indicating the setting to store the log specified by the user through the screen for selecting the setting from the network CMP 28, and selects the setting indicated by such data. Further, at the same time, the PC document reception CMP 24 receives data indicating the role and the disclosure level specified by the user through the screen for selecting the role and the disclosure level, and selects the role and the disclosure level indicated by such data.

At S55, the PC document reception CMP 24 permits the data corresponding to the setting specified as described above to be reported to the history CMP 34, so that such data and the data indicating the role and the disclosure level selected as described above are reported to the history CMP 34. At S56, the history CMP 34 stores the data thus reported in the nonvolatile storage means such as an HDD as the log.

Figure 8:
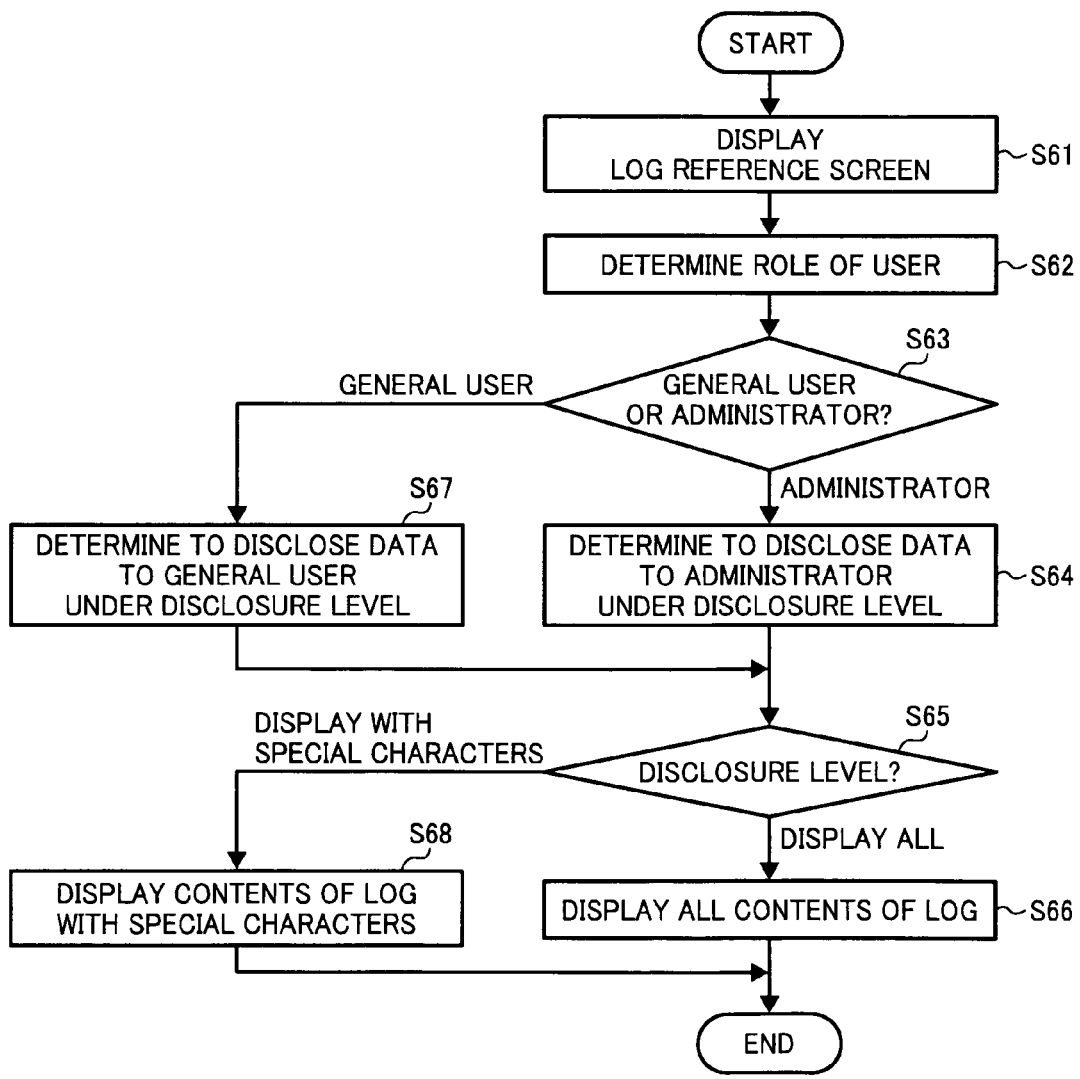
FIG. 8 is a flowchart illustrating an example of a process of selecting a person to whom a log is to be disclosed and a disclosure level when a marking printing operation fails.

FIG. 8 is a flowchart illustrating an example of a process of selecting a person to whom the log is to be disclosed and the disclosure level when the marking printing operation fails.

According to the fourth illustrative embodiment, the image forming apparatus 100 starts the process illustrated in FIG. 8 when the network CMP 28 receives an instruction to display a log reference screen such as a print screen indicating an error log or an error report from the external PC or the operation unit 2 of the image forming apparatus 100 operated by the general user or the administrator. At S61, a CMP, not shown, sends data indicating the log reference screen to the external PC through the network CMP 28, so that the log reference screen is displayed on the display unit of the external PC.

At S62, the access control CMP 35 references the data indicating the role and the disclosure level stored in the nonvolatile storage means to determine the role of the user operating the log reference screen at S63. When the access control CMP 35 determines that the user is the administrator, the process proceeds to S64. By contrast, when the access control CMP 35 determines that the user is the general user, the process proceeds to S67. At S64, the history CMP 34 determines to disclose the data to the administrator under the disclosure level thus selected.

At S67, the history CMP 34 determines to disclose the data to the general user under the disclosure level thus selected. At S65, the history CMP 34 references the data indicating the role and the disclosure level stored in the nonvolatile storage means to determine the disclosure level. When the history CMP 34 determines that the disclosure level permits all logs to be displayed, the process proceeds to S66. By contrast, when the history CMP 34 determines that the logs are displayed using the special characters, the process proceeds to S68.

At S66, the history CMP 34 reads out contents of all logs stored in the nonvolatile storage means, and sends data indicating the contents thus read to the external PC through the network CMP 28, so that such data is displayed on the display unit of the external PC. At S68, the history CMP 34 reads out contents of the logs including the special characters stored in the nonvolatile storage means and sends data indicating the contents thus read out to the external PC through the network CMP 28, so that such data is displayed on the display unit of the external PC.

According to the fourth illustrative embodiment, a person to whom the log is to be disclosed and the disclosure level of the log are selectable. When the data selected is stored as the log, the person to whom the log is to be disclosed and the disclosure level are also stored. Accordingly, when the log thus stored is output, the person to whom the log is to be disclosed and the disclosure level thus stored are referenced, so that contents of the log to be output are changeable depending on the data, and security for implementation of the marking printing operation can be further enhanced.

The foregoing illustrative embodiments are applicable to image forming apparatuses such as a digital copier, a facsimile machine, or a printer, as well as the image forming apparatus 100.

A description is now given of a program according to illustrative embodiments. The program according to the illustrative embodiments causes the CPU that controls the image forming apparatus 100 to implement the functions of the image processing means, the normal printing operation specification means, the marking means, the marking printing operation specification means, the printing operation implementation means, the print data determination means, the printing operation change means, the marking option setting means, the first data determination means, the marking requirement setting means, the second data determination means, the reporting means, the data deletion means, the log storing means, the stored data selection means, and the log data selection means according to the foregoing illustrative embodiment. The program is implemented by the CPU so that the effects described above can be obtained.

The above-described program may be preinstalled in the storage means such as a ROM or a nonvolatile memory including a flash ROM or EEPROM included in the image forming apparatus 100, or an HDD. Alternatively, the program may be recorded on a recording medium such as a CD-ROM or a nonvolatile memory such as a memory card, a flexible disk, an MO, a CD-R, a CD-RW, a DVD+R, a DVD+RW, a DVD-R, a DVD-RW, or a DVD-RAM. The program recorded in the recording medium may be installed in the image forming apparatus 100 to cause the CPU of the image forming apparatus 100 to implement the program, or the program recorded in the recording medium may be read by the CPU to be implemented, so that the processes described above can be performed. Further, the program recorded in the recording medium in an external device connected to a network, or the program stored in storage means in an external device connected to a network may be downloaded to the image forming apparatus 100 to implement the program.

As described above, according to the illustrative embodiments, security breakdowns may be prevented even when implementation of the marking function and implementation of the image processing function are specified simultaneously. As a result, an image forming apparatus with improved security can be provided.

Moreover, illustrative embodiments are not limited to those described above, and various modifications and improvements are possible without departing from the scope of the present invention. It is therefore to be understood that, within the scope of the associated claims, illustrative embodiments may be practiced otherwise than as specifically described herein. For example, elements and/or features of different illustrative embodiments may be combined with each other and/or substituted for each other within the scope of the illustrative embodiments.

What is claimed is:

1. An image forming apparatus, including a non-transitory recording medium storing a program, to print an image on a recording medium based on print data, the image forming apparatus comprising:
    a storing unit to store the print data;
    an image processing unit to perform image processing on image data included in the print data;
    a printing operation specification unit to specify implementation of a printing operation using the image processing unit;
    a marking unit to embed marking data in the image data;
    a marking printing operation specification unit to specify implementation of a marking printing operation using the marking unit;
    a printing operation implementation unit to implement the printing operation specified by the printing operation specification unit or the marking printing operation specified by the marking printing operation specification unit;
    a print data determination unit to determine whether or not the print data includes a setting for the marking printing operation when implementation of the printing operation is specified by the printing operation specification unit at the same time as when implementation of the marking printing operation is specified by the marking printing operation specification unit;
    a printing operation change unit to change a printing operation performed by the printing operation implementation unit depending on a determination result obtained by the print data determination unit;
    a marking option setting unit to set an option for authorizing the marking printing operation from among multiple options for the marking printing operation;
    a first data determination unit to determine whether or not the print data corresponds to the option for authorizing the marking printing operation set by the marking option setting unit,
        wherein the printing operation change unit comprises a unit to prohibit the printing operation performed by the printing operation implementation unit when the first data determination unit determines that the print data does not correspond to the option for authorizing the marking printing operation based on a determination result obtained by the first data determination unit; and
    a reporting unit to report cancellation of a print job and the reason therefor when the printing operation performed by the printing operation implementation unit is prohibited by the printing operation change unit.

2. The image forming apparatus according to claim 1, further comprising:
    a marking requirement setting unit to set a requirement for performing the marking printing operation; and
    a second data determination unit to determine whether or not the print data corresponds to the requirement for performing the making printing operation set by the marking requirement setting unit,
    wherein the printing operation change unit comprises a unit to prohibit the printing operation performed by the printing operation implementation unit when the second data determination unit determines that the print data does not correspond to the requirement for performing the marking printing operation.

3. The image forming apparatus according to claim 1, further comprising a data deletion unit to delete the print data from the storing unit when implementation of the printing operation performed by the printing operation implementation unit is prohibited by the printing operation change unit,
    wherein the reporting unit further comprises a unit to report a status of deletion of the print data performed by the data deletion unit.

4. The image forming apparatus according to claim 1, further comprising a log storing unit to store predetermined data as a log when implementation of the printing operation performed by the printing operation implementation unit is prohibited by the printing operation change unit.

5. The image forming apparatus according to claim 4, further comprising a stored data selection unit to select data stored as the log by the log storing unit.

6. The image forming apparatus according to claim 5, further comprising:
    a log output unit to output the log stored by the log storing unit; and
    a log data selection unit to select a person to whom the log is to be disclosed and a disclosure level of the log,
    wherein the log storing unit stores data on the person to whom the log is to be disclosed and the disclosure level of the log selected by the log data selection unit when storing the data selected by the stored data selection unit as the log, and the log output unit comprises a unit to reference the data on the person to whom the log is to be disclosed and the disclosure level of the log stored at the same time as when the log storing unit stores the data selected by the stored data selection unit as the log to change contents of the log to be output when the log stored in the log storing unit is output.

7. A print processing method employed in an image forming apparatus comprising a storing unit to print an image on a recording medium based on print data stored in the storing unit, the print processing method comprising the steps of:
    processing image data included in the print data;
    specifying implementation of a printing operation using the processing;
    embedding marking data in the image data;
    specifying implementation of a marking printing operation using the embedding;
    implementing the printing operation or the marking printing operation;
    determining whether or not the print data includes a setting for the marking printing operation when implementation of the printing operation is specified at the same time as when implementation of the marking printing operation is specified;

changing a printing operation performed by the implementing depending on a determination result obtained by the determining;

setting an option for authorizing the marking printing operation from among multiple options for the marking printing operation;

determining whether or not the print data corresponds to the option for authorizing the marking printing operation;

prohibiting the printing operation when the determining determines that the print data does not correspond to the option for authorizing the marking printing operation; and reporting cancellation of a print job and the reason therefor when the printing operation is prohibited.

8. A non-transitory recording medium storing a program for causing a computer that controls an image forming apparatus including a storing unit to print an image on a recording medium based on print data stored in the storing unit to execute a print processing method, the print processing method comprising the steps of:

processing image data included in the print data;

specifying implementation of a printing operation using the processing;

embedding marking data in the image data;

specifying implementation of a marking printing operation using the embedding;

implementing the printing operation or the marking printing operation;

determining whether or not the print data includes a setting for the marking printing operation when implementation of the printing operation is specified at the same time as when implementation of the marking printing operation is specified;

changing a printing operation performed by the implementing depending on a determination result obtained by the determining;

setting an option for authorizing the marking printing operation from among multiple options for the marking printing operation;

determining whether or not the print data corresponds to the option for authorizing the marking printing operation;

prohibiting the printing operation when the determining determines that the print data does not correspond to the option for authorizing the marking printing operation; and reporting cancellation of a print job and the reason therefor when the printing operation is prohibited.

* * * * *